Oct. 11, 1966     D. O. LANDON ET AL     3,277,774
REMOTE CONTROL SYSTEM FOR A SPECTROSCOPIC WAVELENGTH COMPUTER
Filed Jan. 16, 1963     2 Sheets-Sheet 1
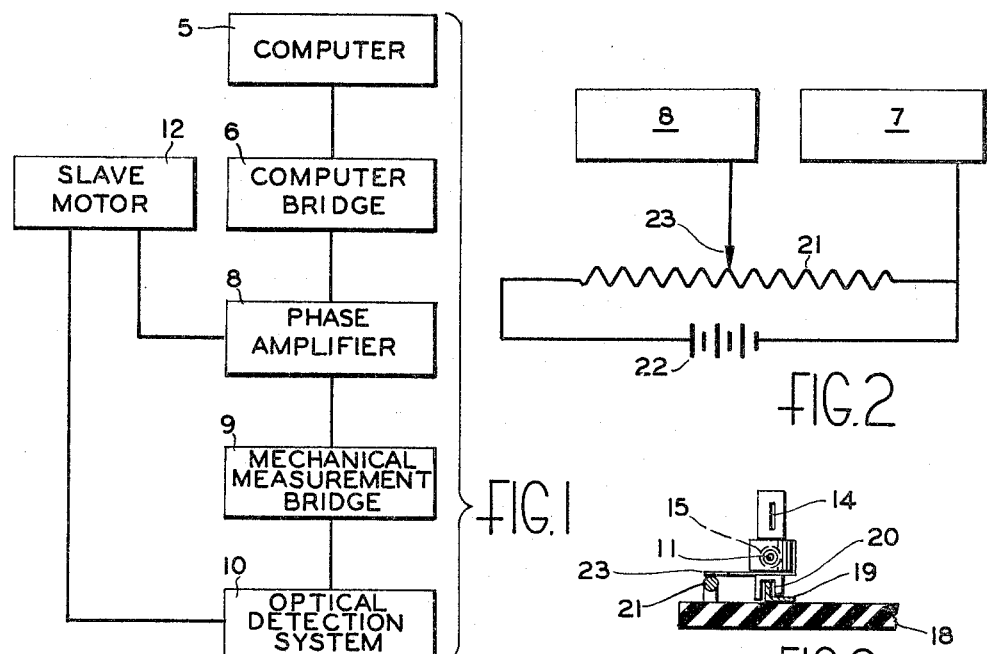
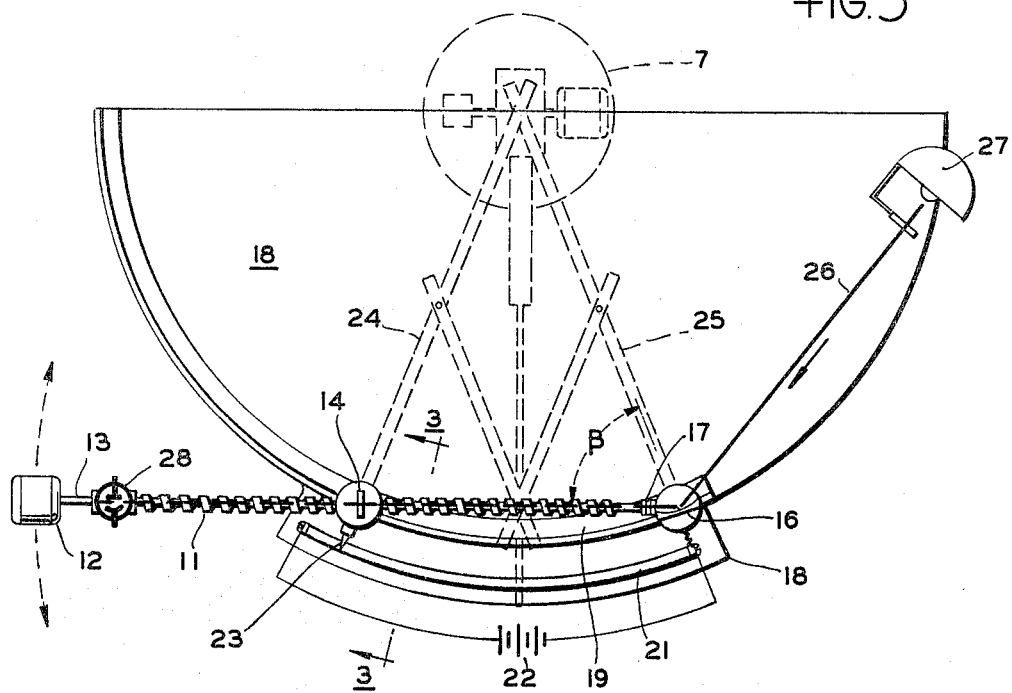
INVENTORS.
DONALD O. LANDON
JOSEPH MARCOVECCHIO
BY
ATTORNEY

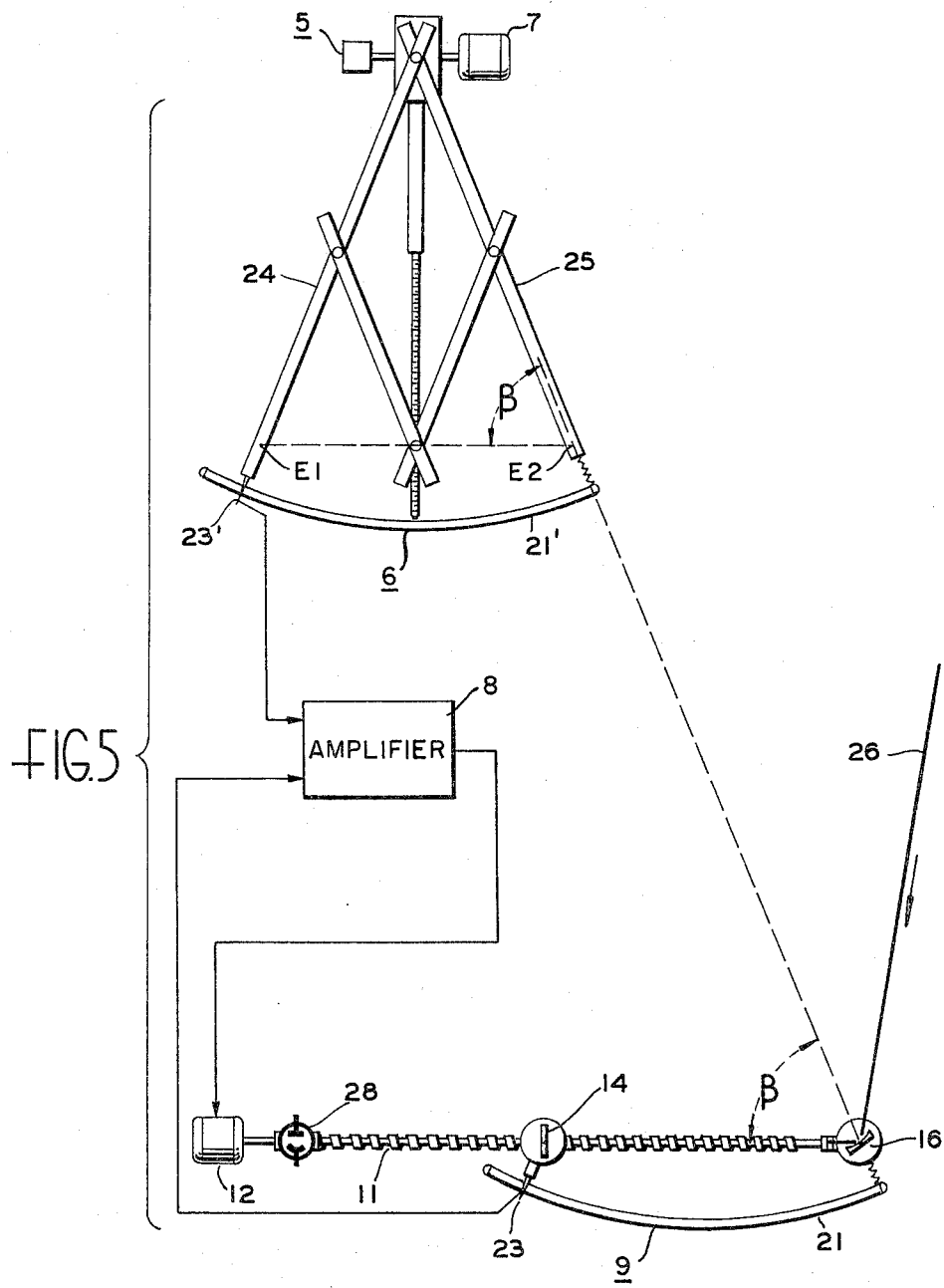

United States Patent Office 3,277,774
Patented Oct. 11, 1966

3,277,774
REMOTE CONTROL SYSTEM FOR A SPECTRO-
SCOPIC WAVELENGTH COMPUTER
Donald O. Landon, Summit, and Joseph Marcovecchio,
Scotch Plains, N.J., assignors to Spex Industries, Inc.,
Scotch Plains, N.J., a corporation of New York
Filed Jan. 16, 1963, Ser. No. 251,933
1 Claim. (Cl. 88—14)

Our invention relates to trigonometric computers and particularly to an improvement on the spectroscopic computer which is the subject matter of Patent Number 3,041,920, granted July 3, 1962.

In computers of the type disclosed by the heretofore mentioned patent, measurements are customarily taken and computations made with the entire system in a vacuum. It has been found that this is satisfactory for small measurements and small computers; but where large instruments are necessary the arms of the computers are subject to such stresses which seriously affect the accuracy of measurements due to the tendency of the arms to bend and flex under such stresses. Therefore, we have invented a ratio slave extension system which will overcome such errors.

One of the objects of our invention is to physically remove the computer section from the optical measurement section of a spectroscopic instrument.

Another object of our invention is to produce a slave measurement system which is exactly proportional to a master computer system.

Another object of our invention is to produce an optical measurement system which reduces errors from the stresses and strains of vacuum or pressure enclosure.

Other objects and advantages of our invention will be apparent from the specification and the drawings in which:

FIG. 1 is a block diagram of the invention.

FIG. 2 is a schematic of the identical slave and mechanically operated resistive bridges which are a part of the invention.

FIG. 3 is a cross section of the mechanical guidance portion of the optical measurement system of the invention taken along 3—3 of FIG. 4.

FIG. 4 is a top plan view of the optical measurement system with the remote computer (appropriately scaled) superimposed in dotted line to show its relationship.

FIG. 5 is a top plan view of the computer and optical measurement system in ratio relationship.

Referring to FIG. 1 of the drawings, 5 represents the computer which is electrically connected to a computer bridge 6; said computer bridge being operated by motor 7 in response to operating signals. A phase amplifier 8 receives signals from computer bridge 6 and a mechanical measurement bridge 9 operated by the optical detection system 10. Phase amplifier 8 is not described as it is a standard piece of equipment well known in the art.

Referring now to the solid line portions of FIG. 4, a screw gear 11 is rotatively driven by slave motor 12 through shaft 13. It must be pointed out here that the motor 12 may be replaced by a hand crank or any other means of rotary motion.

Mounted over and enmeshing screw gear 11 is an optical objective slit 14 whose base is female threaded at 15 (FIG. 3) to intermesh with and ride along on screw gear 11 a sit rotates. This causes slit 14 to approach or recede from optical grating 16 which is stationary; said screw gear 11 being attached to the optical grating by a swivel joint 17.

Attached to a non-conductive base 18 is an arcuate track 19 which is in direct guidance contact with a slit 20 (FIG. 3) in the base of optical slit 14 so that as slit 14 moves toward or away from the optical grating 16, it will be forced along the arc of the guidance track 19.

In exact parallel to the arcuate guidance track 19, there is firmly affixed to the base 18, an arcuate resistance bar 21 whose opposite ends are electrically connected to the anode and cathode of a battery 22, attached to the base of slit 14 is an arm 23 making sliding electrical contact with resistance bar 21 and with computer bridge 6 through phase amplifier 8. Computer bridge 6 is identical in resistance and function with the measurement resistance bar 21 except that it has its contact arm 23' (FIG. 5) attached to arm 24 of the computer; thus a fraction of the total voltage available is impressed at the contact arm 23' and the differential voltage measured by the phase amplifier signaling servo motor 12 which direction to turn to bring the voltages into exact accord at which time the base distance between arm 24 and 25 will be an exact ratio with the base distance between slit 14 and grating 16; thus the calculated angle in the optical measurement system will exactly equal the angle beta in the computer. The latter angle is illustrated in FIGS. 4 and 5 and is the angle of diffraction as set forth in the aforementioned Patent 3,041,920.

FIG. 5 shows a computer 5 including the arms 24 and 25 in a cooperative relationship with a motor 7 for controlling a computer bridge 6 including the measurement resistance element 21' and the associated potentials of battery 22. The mechanical measurement bridge 9 includes the lead screw 11, the cooperating slit 14 and base arrangement (not shown in FIG. 5 but detailed in FIG. 3), and measurement resistance 21 together with the associated potentials of the battery 22. The contact arms 23 and 23' of the computer bridge and mechanical measurement bridge, respectively, are coupled to inputs of the amplifier 8 which receive input voltages from the latter bridges for supplying control power to the slave motor 12.

It will be noted at this point that the computer system and the optical measurement system can be of different sizes so that a small sized computer may be used to control a large measurement system, if so desired.

Operation

Light 26 from a source 27 is directed to grating 16 and reflected through slit 14 to a detecting device 28. As the computer is driven by motor 7 the arm 24 carries along with it contact arm 23' thus transmitting a varying voltage to the computer bridge and activating slave motor 12 through phase amplifier 8. Now as motor 12 is activated slit 14 will move along screw gear 11 controlled by track 19 into an arcuate path, so that the ratio of the distances between slit 14 and grating 16 and between ends E1 and E2 of the arms 24–25 is controllably urged to a predetermined value.

It will be seen by those skilled in the art that all motions in the computer system will be exactly reproduced in the optical detection system; thus all angles in the computer system will be the same as all of the angles in the optical detection system and since the angles of diffraction (beta) are the essences necessary for computation it will be seen that any appropriate scale factor may be introduced.

The system described is electrical in nature but it will be understood by those skilled in the art that such a system may be constructed to operate hydraulically, mechanically or by any other suitable means without departing from the scope of our invention.

It will also be apparent to those skilled in the art that our invention may be used to generate any trigonometric function aside from the use described herein.

We claim:
In a spectroscopic system,
first and second arm members each being pivotally as- sociated near one end thereof with a common pivot means,
a voltage source,
an arcuated resistance bar cooperating with said source for supplying electrical signals,
contact means affixed to a second end of said first arm member and slidably contacting said resistance bar to supply first diffraction angle reference electrical signals,
a drive element,
third and fourth arm members each being pivotally associated near one end thereof with a center segment of one of said first and second arm members and the other end of each of said third and fourth members being pivotally connected to said drive element,
drive control means operative for driving said element to move said arm members whereby said contact means slides upon said resistance bar to supply said first reference electrical signals,
a lead screw and nut arrangement,
a base member with an arcuated guidance track,
a slit device,
common support means for said slit device and the nut of said arrangement and being cooperatively associated with said guidance track for movement of said slit device and said nut along the arc of said guidance track,
a stationary optical grating element,
swivel joint apparatus connecting said grating element to one end of said lead screw,
a source for directing a light sample to said grating element for passage toward said slit device,
an optical detector associated with another end of said lead screw for receiving the light from said grating element which light passes through said slit device,
voltage supply means,
an arcuated resistance device cooperating with said voltage supply means for supplying other electrical signals,
contact apparatus affixed to said common support means and slidably contacting said resistance device to supply second diffraction angle reference electrical signals,
motor means operable for driving said lead screw and nut arrangement whereby said support means is movable along said arc of said guidance means to position said slit device along the longitudinal axis of said lead screw at a prescribed distance to provide an angular location of said slit and detector from said grating element corresponding to said first diffraction angle reference electrical signal,
and amplifier means responsive to the receipt of said first and second electrical signals for operating said motor means to effect said positioning of said slit device.

References Cited by the Examiner

UNITED STATES PATENTS

| | | | |
|---|---|---|---|
| 1,544,871 | 7/1925 | Tiffany | 33—23 |
| 2,325,610 | 8/1943 | Joy | 33—69 |
| 2,675,627 | 4/1954 | Hinchman | 33—205 |
| 3,011,108 | 11/1961 | Blomqvist | 33—49.3 |
| 3,020,794 | 2/1962 | Reichel | 88—14 |
| 3,041,920 | 7/1962 | Landon | 88—14 |
| 3,116,415 | 12/1963 | Jones | 88—14 |

OTHER REFERENCES

Abrendt, W. R., Servomechanism Practice, N.Y., McGraw-Hill Book Co., 1954, pp. 1–3.

JEWELL H. PEDERSEN, Primary Examiner.

RONALD L. WIBERT, Examiner.

L. ORLOFF, E. S. BAUER, Assistant Examiners.